US011235469B2

(12) United States Patent
Horiguchi et al.

(10) Patent No.: US 11,235,469 B2
(45) Date of Patent: Feb. 1, 2022

(54) ROBOT CONTROLLER AND ROBOT SYSTEM

(71) Applicant: Seiko Epson Corporation, Tokyo (JP)

(72) Inventors: Hirosada Horiguchi, Minowa (JP); Shuichi Wakabayashi, Okaya (JP); Makiko Hino, Matsumoto (JP); Kei Kamakura, Hara (JP)

(73) Assignee: SEIKO EPSON CORPORATION, Tokyo (JP)

( * ) Notice: Subject to any disclaimer, the term of this patent is extended or adjusted under 35 U.S.C. 154(b) by 287 days.

(21) Appl. No.: 16/451,121

(22) Filed: Jun. 25, 2019

(65) Prior Publication Data
US 2019/0389065 A1 Dec. 26, 2019

(30) Foreign Application Priority Data

Jun. 26, 2018 (JP) .............................. JP2018-120987

(51) Int. Cl.
*B25J 9/16* (2006.01)
*G01B 11/25* (2006.01)

(52) U.S. Cl.
CPC ........... *B25J 9/1674* (2013.01); *B25J 9/1697* (2013.01); *G01B 11/25* (2013.01)

(58) Field of Classification Search
USPC ................................................. 700/245–264
See application file for complete search history.

(56) References Cited

U.S. PATENT DOCUMENTS

| 9,114,532 B2* | 8/2015 | Ogawa | B25J 9/1674 |
| 2008/0021597 A1* | 1/2008 | Merte | F16P 3/147 |
| | | | 700/255 |
| 2009/0171505 A1* | 7/2009 | Okazaki | B25J 13/084 |
| | | | 700/258 |
| 2010/0207036 A1* | 8/2010 | Massonneau | A61B 5/0059 |
| | | | 250/459.1 |
| 2011/0001957 A1* | 1/2011 | Braune | G01B 11/00 |
| | | | 356/4.01 |
| 2011/0015785 A1* | 1/2011 | Tsusaka | B25J 9/0003 |
| | | | 700/254 |

(Continued)

FOREIGN PATENT DOCUMENTS

| JP | 2004-333369 A | 11/2004 |
| JP | 2010-208002 A | 9/2010 |
| JP | 2017-061026 A | 3/2017 |

*Primary Examiner* — Jonathan L Sample
(74) *Attorney, Agent, or Firm* — Gang Yu (57) ABSTRACT

A robot controller is a robot controller that couples a three-dimensional measuring device configured to perform three-dimensional measurement of an object using a laser beam and a human detection sensor configured to detect a person based on an image obtained by imaging a detection range including the object, the robot controller including a human detection signal receiver configured to receive, from the human detection sensor, a signal indicating that the person is present within the detection range and a robot arm controller configured to control a robot arm based on the signal. When the human detection signal receiver receives, from the human detection sensor, the signal indicating that the person is present within the detection range, the robot arm controller controls the robot arm to set an emitting direction of the laser beam to a direction different from a direction of the person.

6 Claims, 9 Drawing Sheets

(56) References Cited

U.S. PATENT DOCUMENTS

| | | | |
|---|---|---|---|
| 2012/0242974 A1* | 9/2012 | LaValley | G01S 17/87 356/5.01 |
| 2014/0005827 A1* | 1/2014 | Ogawa | G05D 1/021 700/250 |
| 2014/0067121 A1* | 3/2014 | Brooks | B25J 9/1676 700/255 |
| 2014/0200713 A1* | 7/2014 | Allen | G05D 1/0246 700/253 |
| 2015/0032252 A1* | 1/2015 | Galluzzo | B60P 1/5423 700/218 |
| 2015/0217449 A1* | 8/2015 | Meier | G05B 13/027 700/257 |
| 2015/0217455 A1* | 8/2015 | Kikkeri | G06T 7/20 700/259 |
| 2016/0129595 A1* | 5/2016 | Gerio | B25J 13/086 700/255 |
| 2016/0214259 A1* | 7/2016 | Yamamoto | F16P 3/144 |
| 2017/0225336 A1* | 8/2017 | Deyle | G08B 13/196 |
| 2017/0320212 A1* | 11/2017 | Frisk | G05B 19/4061 |
| 2017/0326734 A1* | 11/2017 | Iida | B25J 9/1674 |
| 2018/0071914 A1* | 3/2018 | Heidemann | F16P 3/144 |
| 2019/0129035 A1* | 5/2019 | Valouch | G01S 17/46 |
| 2019/0369641 A1* | 12/2019 | Gillett | A63F 9/24 |
| 2019/0389068 A1* | 12/2019 | Shimizu | B25J 11/005 |
| 2019/0390952 A1* | 12/2019 | Wakabayashi | G01C 15/002 |

\* cited by examiner

FIG. 9 ional measuring device shown in FIG. 3. FIG. 5 is a graph
ROBOT CONTROLLER AND ROBOT SYSTEM The present application is based on, and claims priority from, JP Application Serial Number 2018-120987, filed Jun. 26, 2018, the disclosure of which is hereby incorporated by reference herein in its entirety.

BACKGROUND

1. Technical Field

The present disclosure relates to a robot controller and a robot system.

2. Related Art

JP-A-2004-333369 (Patent Literature 1) describes an articulated robot in which a three-dimensional shape measuring device is mounted on an arm. The three-dimensional shape measuring device mounted on the arm includes a laser beam irradiator for measurement configured to scan a laser beam for measurement toward an object to thereby project a pattern on the object and an optical receiver configured to acquire an image of the object on which the pattern is projected. The three-dimensional shape measuring device is configured to perform three-dimensional measurement of the object based on the image acquired by the optical receiver.

In such a configuration, since the three-dimensional shape measuring device is mounted on the arm, an emitting direction of the laser beam for measurement changes according to a direction of the arm. Therefore, it is likely that the laser beam is irradiated on a person present around the articulated robot and adversely affects the person.

SUMMARY

A robot controller according to an aspect of the present disclosure is a robot controller that couples a three-dimensional measuring device configured to perform three-dimensional measurement of an object using a laser beam and a human detection sensor configured to detect a person based on an image obtained by imaging a detection range including the object, the robot controller including: a human detection signal receiver configured to receive, from the human detection sensor, a signal indicating that the person is present within the detection range; and a robot arm controller configured to control a robot arm based on the signal. When the human detection signal receiver receives, from the human detection sensor, the signal indicating that the person is present within the detection range, the robot arm controller controls the robot arm to set an emitting direction of the laser beam to a direction different from a direction of the person.

DESCRIPTION OF EXEMPLARY EMBODIMENTS

A robot controller and a robot system of the present disclosure are explained in detail below based on an embodiment shown in the accompanying drawings.

First Embodiment

Figure 1:
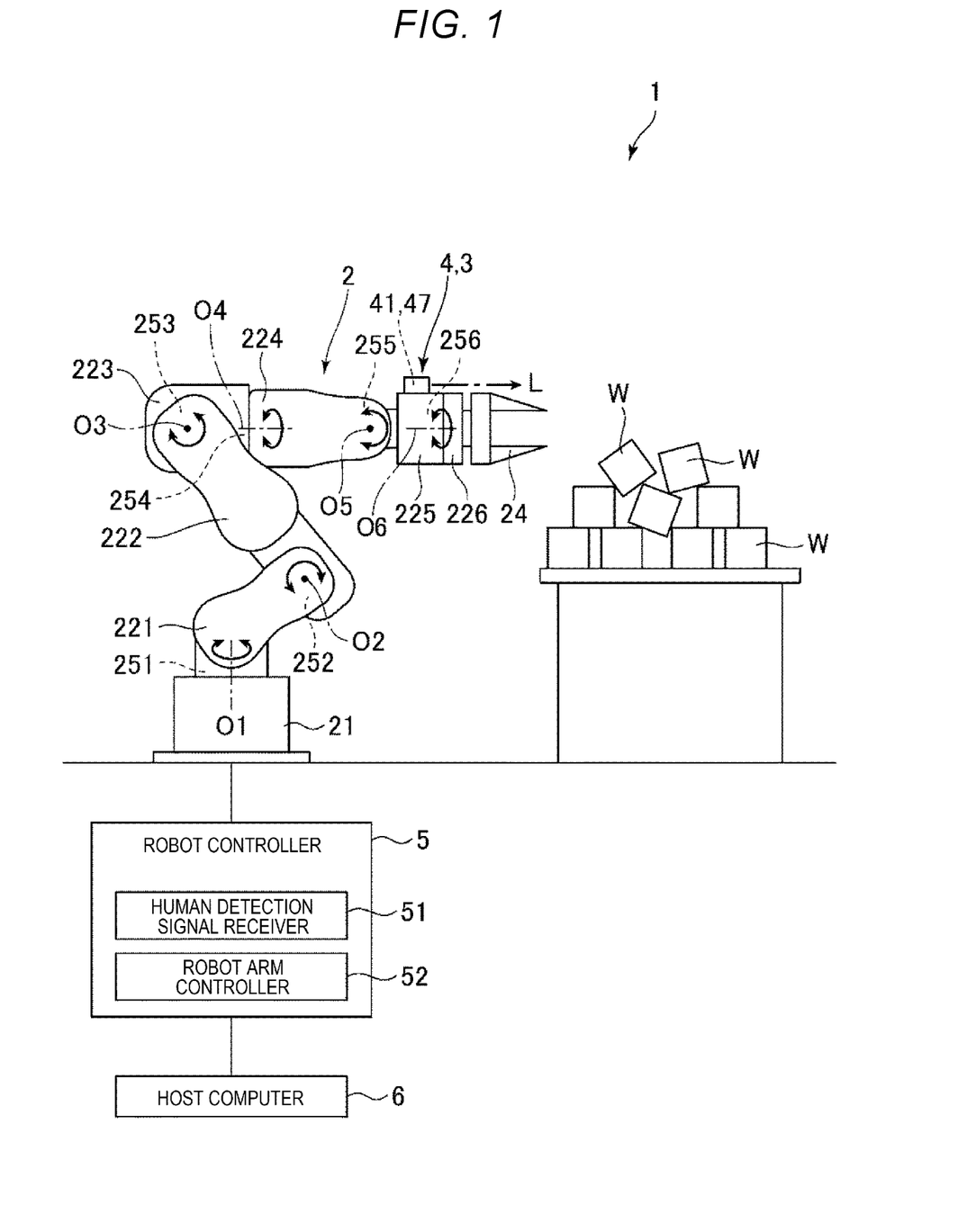
FIG. 1 is a diagram showing an overall configuration of a robot system according to a first embodiment of the present disclosure.
Figure 2:
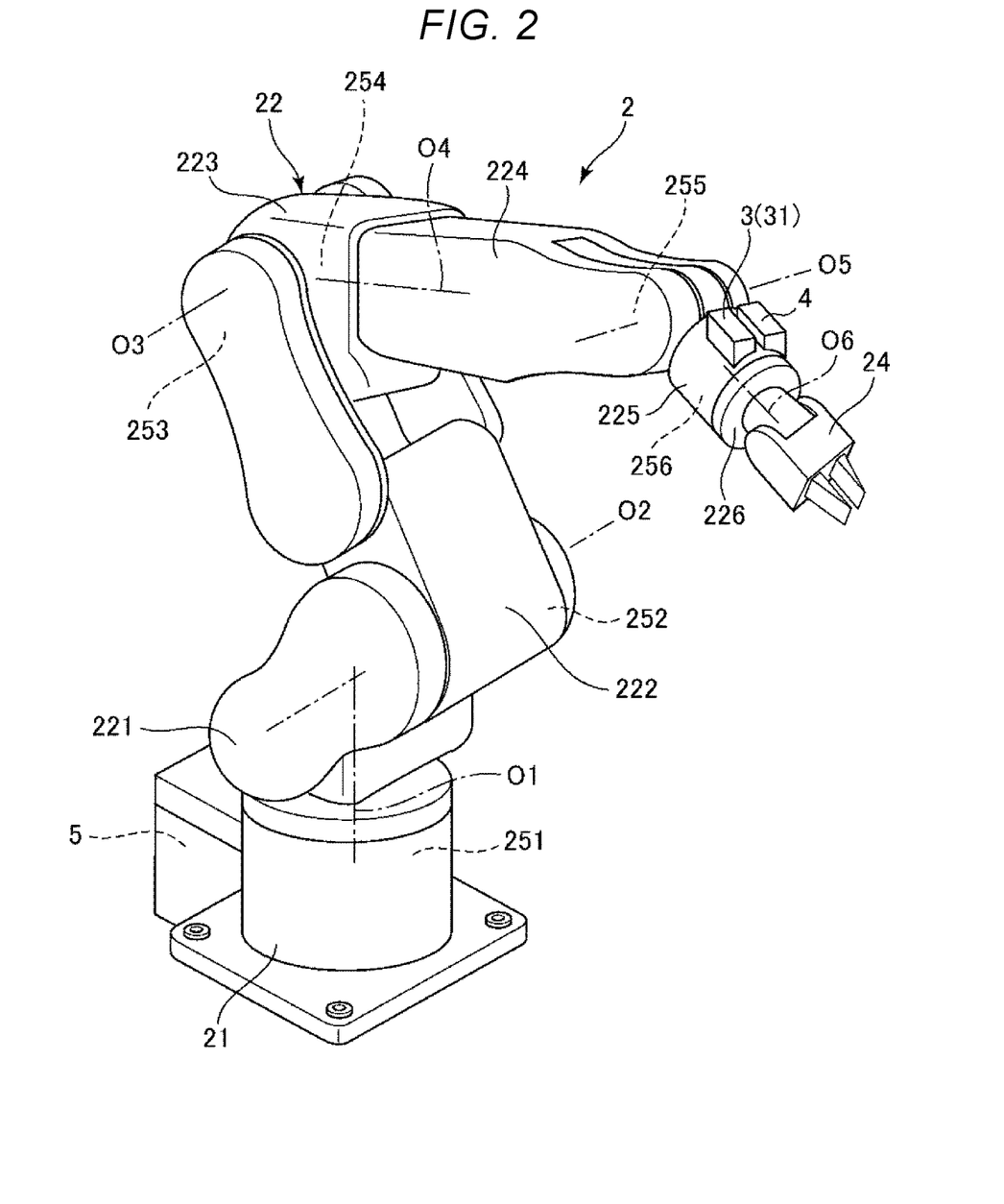
FIG. 2 is a perspective view showing a robot.
Figure 3:
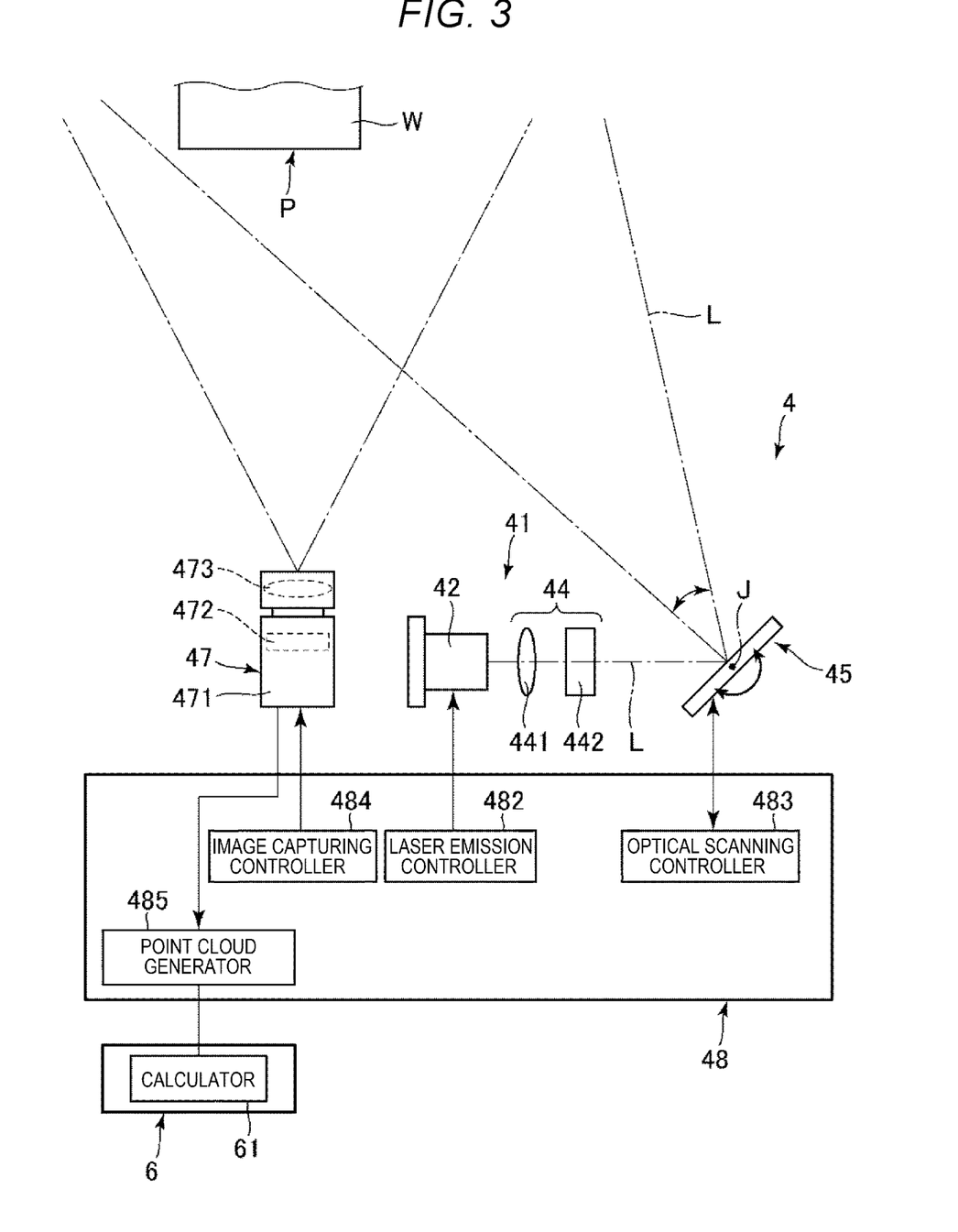
FIG. 3 is a diagram showing an overall configuration of a three-dimensional measuring device.
Figure 4:
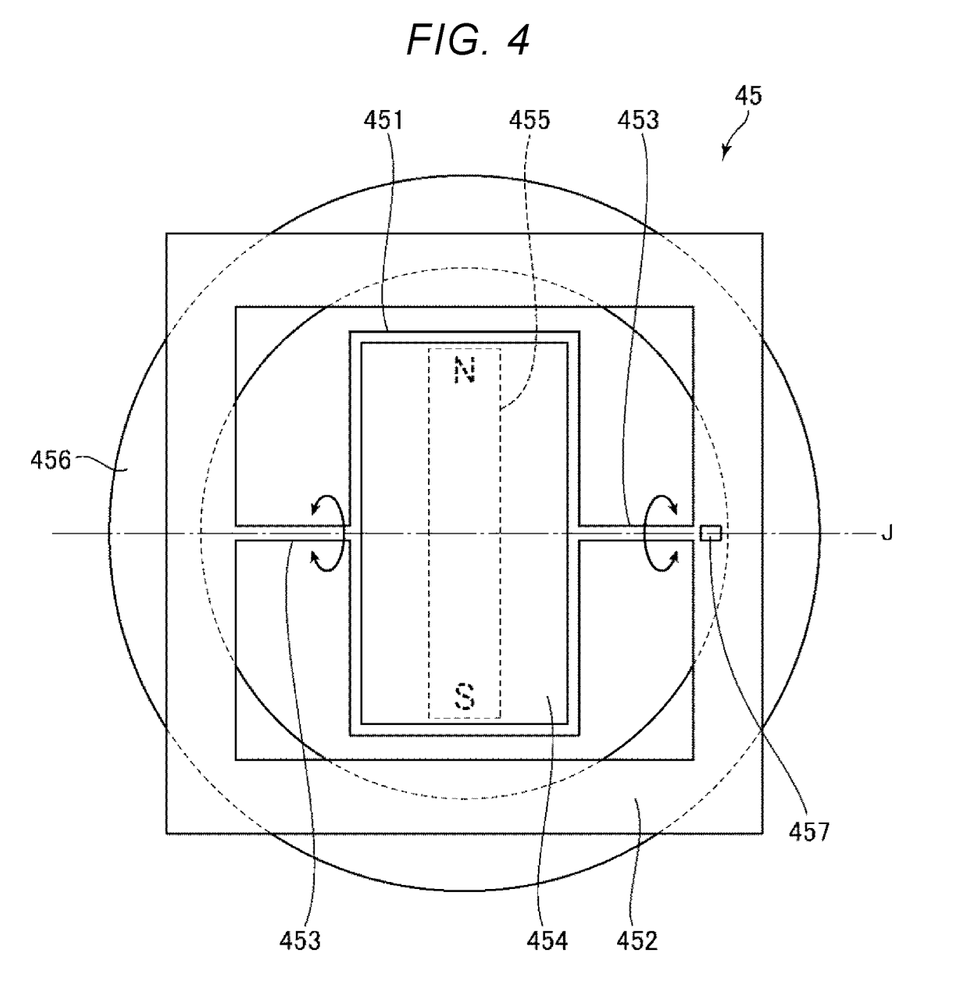
FIG. 4 is a plan view showing an optical scanner included in the three-dimensional measuring device shown in FIG. 3.
Figure 5:
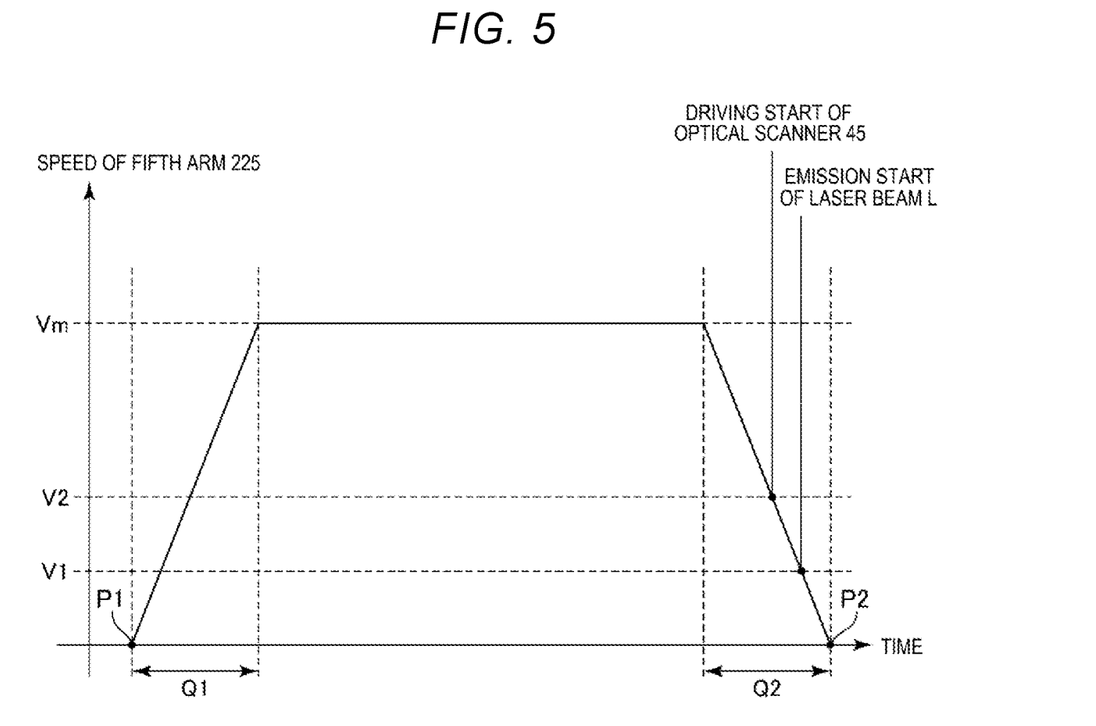
FIG. 5 is a graph showing moving speed of a robot arm.
Figure 6:
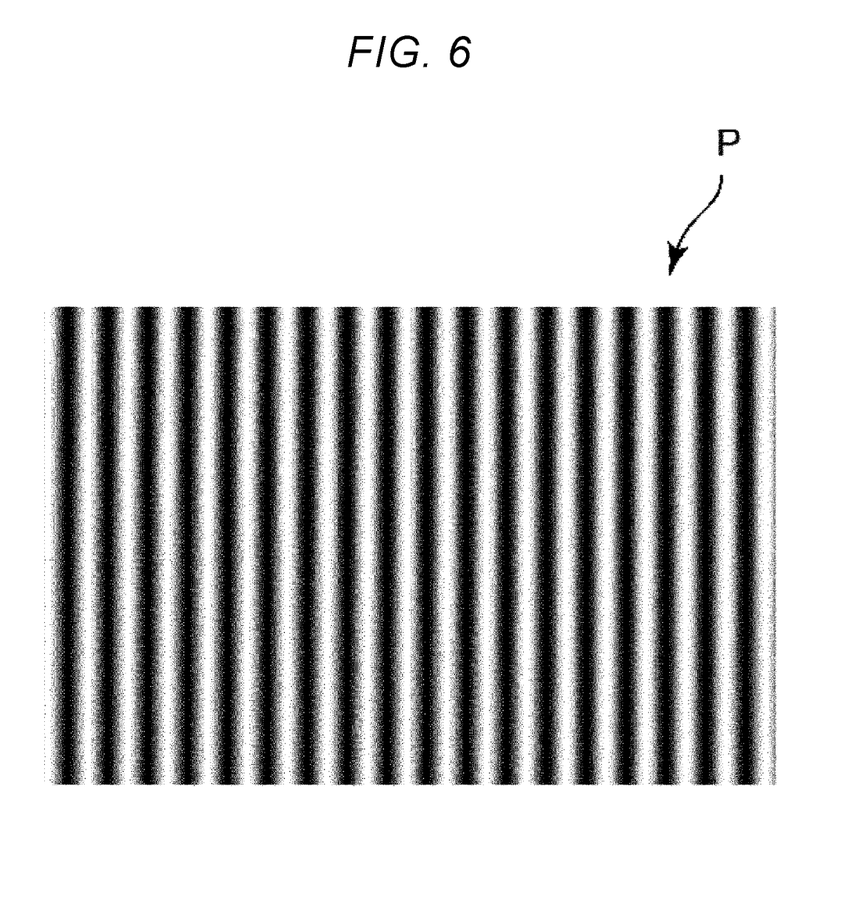
FIG. 6 is a plan view showing a projection pattern projected by a laser emitter.
Figure 7:
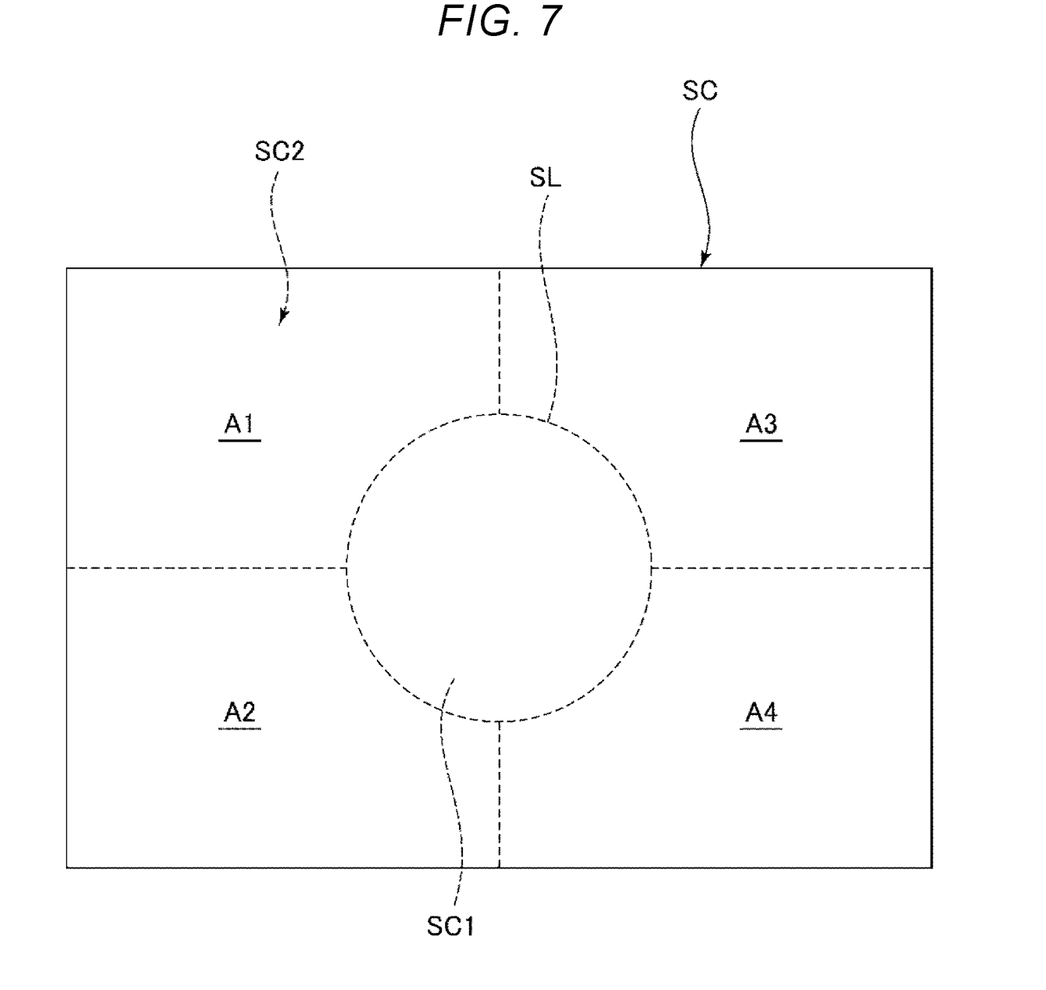
FIG. 7 is a plan view showing a detection range of a human detection sensor.
Figure 8:
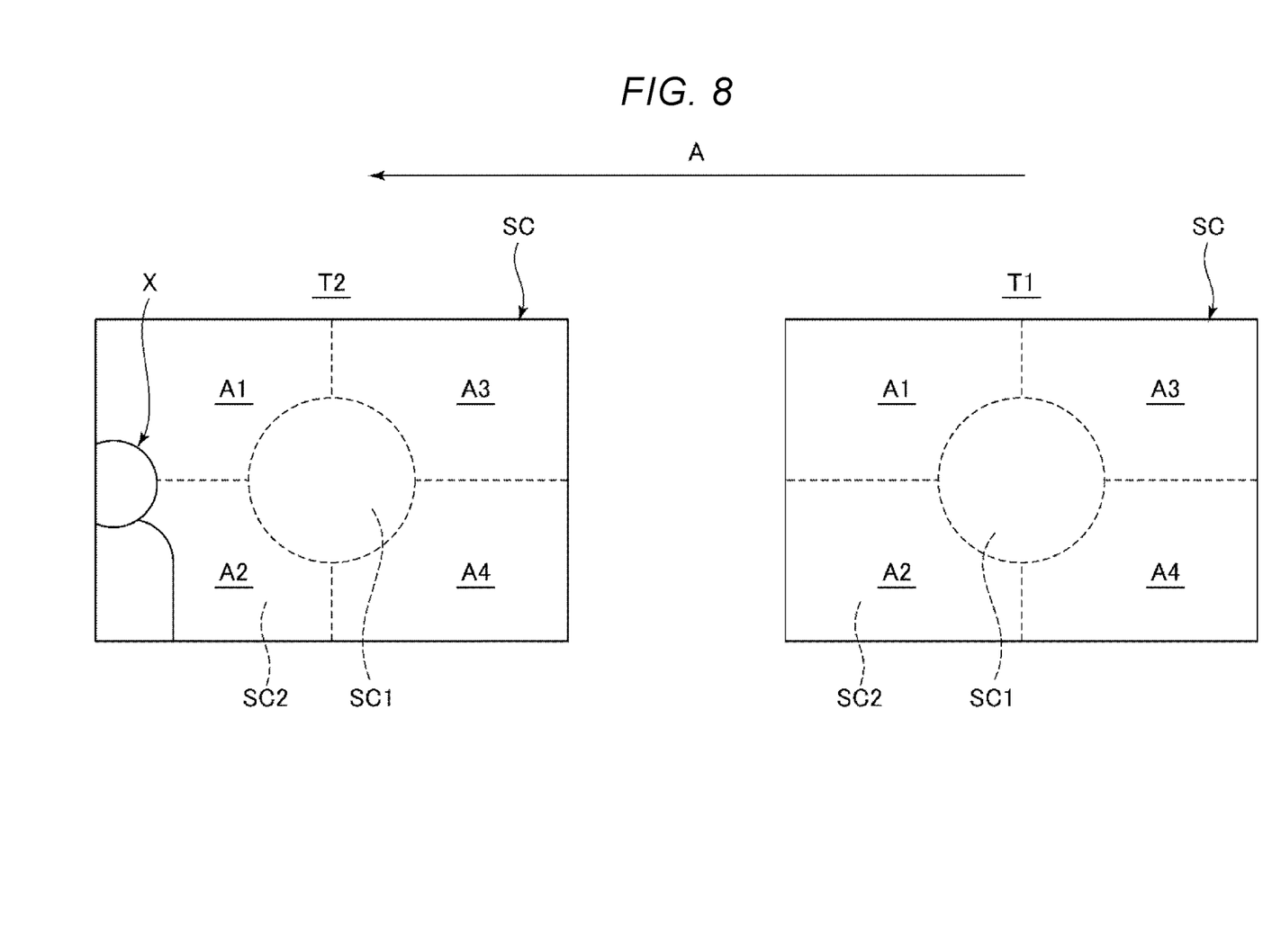
FIG. 8 is a plan view showing a state in which the human detection sensor detects a person.
Figure 9:
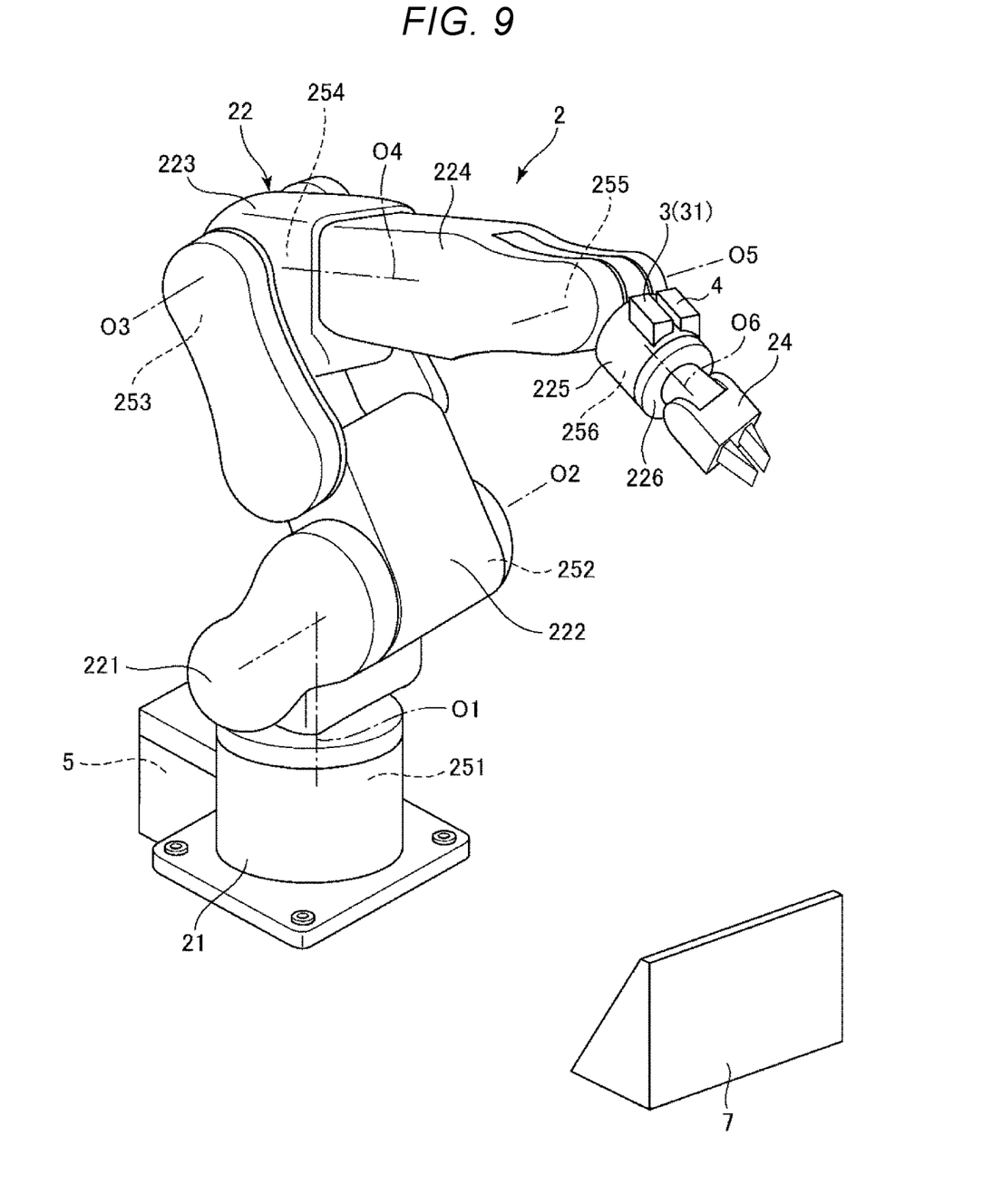
FIG. 9 is a perspective view showing a state in which a member that absorbs or scatters a laser beam is disposed near the robot.

FIG. 1 is a diagram showing an overall configuration of a robot system according to a first embodiment of the present disclosure. FIG. 2 is a perspective view showing a robot. FIG. 3 is a diagram showing an overall configuration of a three-dimensional measuring device. FIG. 4 is a plan view showing an optical scanner included in the three-dimensional measuring device shown in FIG. 3. FIG. 5 is a graph showing moving speed of a robot arm. FIG. 6 is a plan view showing a projection pattern projected by a laser emitter. FIG. 7 is a plan view showing a detection range of a human detection sensor. FIG. 8 is a plan view showing a state in which the human detection sensor detects a person. FIG. 9 is a perspective view showing a state in which a member that absorbs or scatters a laser beam L is disposed near the robot.

A robot system 1 shown in FIG. 1 is a robot system of a human coexistent type based on the premise that the robot system 1 coexists (cooperates) with a person, that is, the person works around the robot system 1. Therefore, the robot system 1 is configured to detect presence of a person present within a detection range and take measures corresponding to the presence of the person.

The robot system 1 includes a robot 2 including a robot arm 22, a human detection sensor 3 disposed in the robot arm 22 and configured to detect a person present around the robot 2, a three-dimensional measuring device 4 disposed in the robot arm 22 and configured to three-dimensionally measure an object W using a laser beam L, a robot controller 5 configured to control driving of the robot 2 based on a measurement result of the three-dimensional measuring device 4, and a host computer 6 capable of communicating with the robot controller 5. These sections are enabled to communicate by wire or radio. This communication may be performed via a network such as the Internet.

Such a robot system 1 is configured to, when the human detection sensor 3 detects a person, change a direction of the robot arm 22 to prevent the laser beam L from being emitted toward the person. Consequently, the laser beam L is not irradiated toward the person. Therefore, the robot system 1 is safe. Such a robot system 1 is explained in detail below.

Robot

The robot 2 is a robot that performs work such as supply, removal, conveyance, and assembly of a precision instrument and components configuring the precision instrument. However, uses of the robot 2 are not particularly limited.

The robot 2 is a six-axis robot. The robot 2 includes, as shown in FIG. 2, a base 21 fixed to a floor or a ceiling, a first arm 221 coupled to the base 21 turnably around a first axis O1, a second arm 222 coupled to the first arm 221 turnably around a second axis O2, a third arm 223 coupled to the second arm 222 turnably around a third axis O3, a fourth arm 224 coupled to the third arm 223 turnably around a fourth axis O4, a fifth arm 225 coupled to the fourth arm 224 turnably around a fifth axis O5, and a sixth arm 226 coupled to the fifth arm 225 turnably around a sixth axis O6. A hand coupling section is provided in the sixth arm 226. An end effector 24 corresponding to work to be executed by the robot 2 is attached to the hand coupling section.

The robot 2 includes a first driving device 251 configured to turn the first arm 221 with respect to the base 21, a second driving device 252 configured to turn the second arm 222 with respect to the first arm 221, a third driving device 253 configured to turn the third arm 223 with respect to the second arm 222, a fourth driving device 254 configured to turn the fourth arm 224 with respect to the third arm 223, a fifth driving device 255 configured to turn the fifth arm 225 with respect to the fourth arm 224, and a sixth driving device 256 configured to turn the sixth arm 226 with respect to the fifth arm 225. The first to sixth driving devices 251 to 256 respectively include, for example, motors functioning as driving sources, controllers configured to control driving of the motors, and encoders configured to detect rotation amounts of the motors. The first to sixth driving devices 251 to 256 are respectively independently controlled by the robot controller 5.

The robot 2 is not limited to the configuration in this embodiment. For example, the number of arms may be one to five or may be seven or more. For example, a type of the robot 2 may be a SCARA robot or a double-arm robot.

Three-Dimensional Measuring Device

The three-dimensional measuring device 4 detects a posture, a position, and the like of the object W according to a phase shift method. As shown in FIG. 3, the three-dimensional measuring device 4 includes a laser emitter 41 configured to irradiate the laser beam L on a region including the object W, an image capturing device 47 configured to image the object W, on which the laser beam L is irradiated, and acquire image data, and a controller 48 configured to control driving of the laser emitter 41 and the image capturing device 47 and generate three-dimensional point cloud of the object W from the image data acquired by the image capturing device 47.

Among these components, the laser emitter 41 and the image capturing device 47 are respectively fixed to the fifth arm 225 of the robot 2. The laser emitter 41 is disposed to irradiate the laser beam L toward the distal end side (the end effector 24 side) of the fifth arm 225. The image capturing device 47 is disposed to face the distal end side (the end effector 24 side) of the fifth arm 225 and image a region including an irradiation range of the laser beam L.

A relation in which the end effector 24 is located on the distal end side of the fifth arm 225 is maintained even if the arms 221 to 224 and 226 other than the fifth arm 225 move. Therefore, when the laser emitter 41 and the image capturing device 47 are fixed to the fifth arm 225, the three-dimensional measuring device 4 can always emit the laser beam L to the distal end side of the end effector 24 and can image the distal end side of the end effector 24. Therefore, irrespective of a posture at the time when the robot 2 is about to grip the object W with the end effector 24, that is, a posture in which the end effector 24 is opposed to the object W, in the posture, the three-dimensional measuring device 4 can irradiate the laser beam L toward the object W and can image the object W. Therefore, the three-dimensional measuring device 4 can more surely perform three-dimensional measurement of the object W.

However, the disposition of the laser emitter 41 and the image capturing device 47 is not particularly limited. The laser emitter 41 and the image capturing device 47 may be fixed to the first to fourth arms 221 to 224 and the sixth arm 226. Further, the laser emitter 41 and the image capturing device 47 may be fixed to a different arm. At least one of the laser emitter 41 and the image capturing device 47 may be fixed to an unmovable part such as the base 21, a floor, a ceiling, or a wall.

The laser emitter 41 has a function of irradiating the laser beam L toward the object W to thereby project a predetermined projection pattern P (see FIG. 6) on the object W. Such a laser emitter 41 includes, as shown in FIG. 3, a laser beam source 42 configured to emit the laser beam L, an optical system 44 including a plurality of lenses through which the laser beam L passes, and an optical scanner 45 configured to scan the laser beam L, which has passed through the optical system 44, toward the object W.

The laser beam source 42 is not particularly limited. For example, semiconductor lasers such as a vertical cavity surface emitting laser (VCSEL) and a vertical external cavity surface emitting laser (VECSEL) can be used. A wavelength of the laser beam L is not particularly limited. The wavelength of the laser beam L may be in a visible region (400 to 700 nm), may be in an invisible region (400 nm or less and 1400 nm to 1 mm), or may be in a near-infrared region (700 to 1400 nm). However, the wavelength of the laser beam L is desirably in the visible region (400 to 700 nm). In the visible region, even if the laser beam L enters the eyes of a person coexisting with the robot 2, the person can instantaneously feel glare and show a defense reaction by blinking. Therefore, by setting the wavelength of the laser beam L in the visible region, the robot system 1 is safer.

The optical system 44 includes a collimator lens 441 configured to collimate the laser beam L emitted from the laser beam source 42 and a rod lens 442 (a lens) configured to change the laser beam L collimated by the collimator lens 441 to a line shape extending in a direction parallel to a turning axis J explained below (a paper surface depth direction of FIG. 23).

The optical scanner 45 has a function of scanning the laser beam L changed to the line shape by the rod lens 442. Consequently, it is possible to two-dimensionally (planarly) irradiate the laser beam L. The optical scanner 45 is not particularly limited. For example, an MEMS (Micro Electro Mechanical Systems), a Galvano mirror, and a polygon mirror can be used.

The optical scanner 45 in this embodiment is configured by the MEMS. As shown in FIG. 4, the optical scanner 45 includes a movable section 451, a supporting section 452 configured to support the movable section 451, a beam section 453 configured to couple the movable section 451 and the supporting section 452 and enable the movable section 451 to turn around the turning axis J with respect to the supporting section 452, a mirror 454 disposed on the front surface (the surface on the paper surface near side of FIG. 4) of the movable section 451 and configured to reflect the laser beam L, a permanent magnet 455 provided on the rear surface (the surface on the paper surface depth side of FIG. 3) of the movable section 451, and a coil 456 disposed to be opposed to the permanent magnet 455. The movable section 451, the supporting section 452, and the beam section 453 are, for example, integrally formed from a silicon substrate.

Such an optical scanner 45 is disposed such that the turning axis J substantially coincides with an extending direction of the laser beam L having the line shape. When a driving signal (an alternating voltage) is applied to the coil 456, the movable section 451 turns around the turning axis J. Consequently, the laser beam L having the line shape is scanned.

The optical scanner 45 includes a piezoresistor 457 provided in the supporting section 452. A resistance value of the piezoresistor 457 changes according to stress generated in the supporting section 452 as the movable section 451 turns around the turning axis J. Therefore, the optical scanner 45 can detect a turning angle of the movable section 451 based on the resistance value change of the piezoresistor 457. The piezoresistor 457 can be formed by doping (diffusing or injecting) impurities such as phosphorus or boron in a silicon substrate.

The laser emitter 41 is explained above. In such a laser emitter 41, as explained above, the laser beam L is two-dimensionally scattered by the optical system 44 and the optical scanner 45. Therefore, the intensity of the laser beam L, that is, an energy amount per unit time in regions on which the laser beam L can be irradiated decreases as further away from the laser emitter 41, in other words, as the optical path length of the laser beam L increases. By adopting such a configuration, it is possible to more effectively prevent the high-intensity laser beam L from entering the eyes of the person coexisting with the robot 2. Therefore, the robot system 1 is safe for the person coexisting with the robot 2.

The configuration of the laser emitter 41 is not particularly limited if the laser emitter 41 can project the predetermined projection pattern P on the object W. For example, in this embodiment, the laser beam L is scattered in the line shape by the optical system 44. However, not only this, but, for example, the laser beam L may be scattered in the line shape using an MEMS or a Galvano mirror. That is, the laser beam L may be two-dimensionally scanned using two optical scanners 45. For example, the laser beam L may be two-dimensionally scanned using an MEMS of a gimbal type having a two-axis degree of freedom.

The image capturing device 47 images a state in which the projection pattern P is projected on at least one object W. That is, the image capturing device 47 images at least one object W including the projection pattern P. As shown in FIG. 3, the image capturing device 47 is configured by, for example, a camera 471 including an imaging device 472 such as a CMOS image sensor or a CCD image sensor and a condensing lens 473.

As shown in FIG. 3, the controller 48 includes a laser emission controller 482 configured to control driving of the laser beam source 42, an optical scanning controller 483 configured to control driving of the optical scanner 45, an image capturing controller 484 configured to control driving of the image capturing device 47, and a point cloud generator 485 configured to generate, based on image data acquired by the image capturing device 47, three-dimensional point cloud of the region including the object W.

The controller 48 is configured from, for example, a computer. The controller 48 includes a processor (a CPU) configured to process information, a memory communicably connected to the processor, and an external interface. Various computer programs executable by the processor are saved (stored) in the memory. The processor can read and execute the various computer programs and the like stored in the memory.

The optical scanning controller 483 controls driving of the optical scanner 45 by applying a driving signal to the coil 456. The optical scanning controller 483 detects a turning angle of the movable section 451 based on a resistance value change of the piezoresistor 457. The optical scanning controller 483 drives the movable section 451 in a non-resonant manner. That is, the optical scanning controller 483 applies, to the coil 456, a driving signal having a frequency sufficiently separated from a resonant frequency of a vibration system including the movable section 451 and the beam section 453. Consequently, compared with when the movable section 451 is driven in a resonant manner, it is possible to freely control a waveform, an amplitude, a frequency, and the like of the movable section 451. However, the optical scanning controller 483 may be configured to drive the movable section 451 in a resonant manner.

The optical scanning controller 483 starts driving of the optical scanner 45 after detecting that the moving speed of the fifth arm 225 decreases to be equal to or lower than second speed V2. More specifically, as shown in FIG. 5, when the fifth arm 225 moves from a present position P1 to a gripping position P2 for gripping the object W in order to grip the object W, at least an acceleration region Q1 where the fifth arm 225 is accelerated and a deceleration region Q2 where the fifth arm 225 is decelerated are generated. The optical scanning controller 483 starts driving of the optical scanner 45 after the moving speed of the fifth arm 225 decreases to be equal to or lower than the second speed V2 in the deceleration region Q2. The second speed V2 is larger than 0 (zero) and smaller than maximum speed Vm of the robot arm 22. That is, 0<V2<Vm is satisfied.

Consequently, for example, it is possible to reduce a driving time of the optical scanner 45 compared with when the optical scanner 45 is always driven. Therefore, it is possible to achieve power saving of the robot system 1. It is possible to reduce a time required from when the robot arm 22 stops until the three-dimensional measurement of the object W is started compared with when the driving of the optical scanner 45 is started after the robot arm 22 stops. Therefore, operation efficiency of the robot 2 is improved. "The robot arm 22 stops" refers to "driving of the first to sixth driving devices 251 to 256 stops". Vibration remaining after the stop (residual vibration) is not considered.

The control by the optical scanning controller 483 is not limited to the control explained above. For example, the optical scanning controller 483 may always drive the optical scanner 45 or may start the driving of the optical scanner 45 after the robot arm 22 stops.

The laser emission controller 482 emits the laser beam L from the laser beam source 42 after the turning of the movable section 451 is started. For example, if the laser beam L is emitted in a state in which the movable section 451 is not turning and a posture of the movable section 451 is fixed, the laser beam L is continuously irradiated on the same part. If the eyes of a person are present on an optical path of the laser beam L, the laser beam L is continuously irradiated on the eyes of the person. The laser beam L is likely to adversely affect the eyes depending on, for example, the intensity of the laser beam L. On the other hand, if the turning of the movable section 451 is started earlier than the emission of the laser beam L, the laser beam L is scanned and is not continuously irradiated on the same part. Therefore, the problem described above less easily occurs. The robot system 1 is safer.

The laser emission controller 482 stops the emission of the laser beam L from the laser beam source 42 before the turning of the movable section 451 stops. Consequently, the laser beam L is always irradiated after being scanned by the optical scanner 45. Therefore, the laser beam L is not continuously irradiated on the eyes of the person. The robot system 1 is safer.

The laser emission controller 482 emits the laser beam L after the moving speed of the fifth arm 225 decreases to be equal to or lower than first speed V1 lower than the second speed V2. The first speed V1 is larger than 0 (zero). That is, 0<V1<V2 is satisfied. As explained above, the driving of the optical scanner 45 is started after the moving speed of the fifth arm 225 decreases to be equal to or lower than the second speed V2. Therefore, by emitting the laser beam L after the moving speed of the fifth arm 225 decreases to the first speed V1 lower than the second speed V2, it is possible to more surely emit the laser beam L in a state in which the movable section 451 is turning.

However, the control by the laser emission controller 482 is not limited to the control explained above. For example, the laser emission controller 482 may always emit the laser beam L or may emit the laser beam L after the robot arm 22 stops.

The image capturing controller 484 controls driving of the camera 471. The projection pattern P is, for example, a sine wave pattern. The projection pattern P is projected four times with a phase shifted by π/2 at a time. Every time the projection pattern P is projected, the image capturing controller 484 images, with the camera 471, the object W on which the projection pattern P is projected. However, the number of times of projection of the projection pattern P is not particularly limited and only has to be the number of times with which a phase can be calculated from an imaging result. The image capturing controller 484 may perform the same projection and imaging using a projection pattern having a large pitch or a projection pattern having a small pitch and perform phase connection. A measurement range and resolution can be improved as types of pitches are increased. However, since the number of times increases, a time required for acquiring image data increases and the operation efficiency of the robot 2 is deteriorated. Therefore, the number of times of projection of the projection pattern P only has to be set as appropriate according to a balance of accuracy and a measurement range of three-dimensional measurement and the operation efficiency of the robot 2.

The point cloud generator 485 generates, using a phase shift method, three-dimensional point cloud of the region including the object W from a plurality of image data acquired by the camera 471. The three-dimensional point cloud generated by the point cloud generator 485 is transmitted to the host computer 6. The three-dimensional point cloud is, for example, data in which three-dimensional coordinates of points on image data are recorded.

Host Computer

The host computer 6 includes a calculator 61 configured to calculate, based on the three-dimensional point cloud received from the point cloud generator 485, three-dimensional information including a posture, a position (a space coordinate), and the like of the object W. For example, information concerning the shape of the object W is stored in the calculator 61. It is possible to calculate a posture and a position of the object W by matching the three-dimensional point cloud and the shape of the object W. However, not only this, but the shape of the object W may be acquired from the three-dimensional point cloud.

The host computer 6 generates a position command for the robot 2 from the calculated three-dimensional information of the object W and transmits the generated position command to the robot controller 5. The robot controller 5 respectively independently drives the first to sixth driving devices 251 to 256 based on the position command received from the host computer 6 and moves the first to sixth arms 221 to 226 to instructed positions.

In this embodiment, the host computer 6 includes the calculator 61. However, not only this, but, for example, the three-dimensional measuring device 4 or the robot controller 5 may include the calculator 61 or another device may include the calculator 61.

Human Detection Sensor

As shown in FIG. 2, the human detection sensor 3 is fixed to the fifth arm 225 of the robot 2. Therefore, a relative positional relation with the laser emitter 41 fixed to the fifth arm 225 is maintained constant. In this embodiment, the human detection sensor 3 includes a camera 31 functioning as an image capturing device. The human detection sensor 3 detects presence or absence of a person based on image data captured by the camera 31. Further, when detecting a person, the human detection sensor 3 detects the position of the person. The human detection sensor 3 may detect the position of the eyes of the person using a technique for detecting characteristic information of a face and the like of the person from the image data. For example, the camera 471 explained above may function as the camera 31 as well. That is, the camera 471 may have both of a function of detecting a person in a detection area and a function of imaging the object W on which the projection pattern P is projected.

As shown in FIG. 7, an image capturing area SC of the camera 31 serving as a detection range of the human detection sensor 3 is larger than an irradiation range SL of the laser beam L and includes the entire region of the irradiation range SL. Specifically, the image capturing area SC includes a first region SC1 overlapping the irradiation range SL and a second region SC2 located on the outer side of the first region SC1 and surrounding the entire circumference of the first region SC1. Since the image capturing area SC includes the second region SC2 in this way, it is possible to more surely detect a person located in the irradiation range SL or near the irradiation range SL.

A target of detection by the human detection sensor 3 is not limited to a person and may be any objects that can move to near the robot 2 such as an animal other than the person, a robot other than the robot 2, a mobile body such as an automatic guided vehicle (AGV), and other movable various electronic devices. When these objects are present in the image capturing area SC, the robot system 1 may determine the objects like the person or may distinguish the objects from the person.

Robot Controller

The robot controller 5 receives a position command for the robot 2 from the host computer 6 and respectively independently controls driving of the first to sixth driving devices 251 to 256 to locate the arms 221 to 226 in positions corresponding to the received position command. The robot controller 5 is configured from, for example, a computer. The robot controller 5 includes a processor (a CPU) configured to process information, a memory communicably connected to the processor, and an external interface. Various computer programs executable by the processor are saved in the memory. The processor can read and execute the various computer programs and the like stored in the memory.

As shown in FIG. 1, the robot controller 5 includes a human detection signal receiver 51 configured to receive a signal from the human detection sensor 3 and a robot arm controller 52 configured to control driving of the robot arm 22 based on the signal from the human detection sensor 3. When the human detection signal receiver 51 receives, from the human detection sensor 3, a signal indicating that a person is present in the detection range of the human detection sensor 3, the robot arm controller 52 drives the fifth arm 225 to set an emitting direction of the laser beam L to a direction different from the direction of the person.

For example, when the camera 31 detects a person X in the image capturing area SC while the laser emitter 41 emits the laser beam L and the fifth arm 225 moves from a predetermined position to the gripping position P2, the robot arm controller 52 changes the direction of the fifth arm 225 to set the emitting direction of the laser beam L to a direction different from the direction of the person X. Consequently, irradiation of the laser beam L on the person X is suppressed. The robot system 1 is safer for the person X. The "direction different from the direction of the person X" refers to a direction in which the laser beam L is not irradiated on the eyes of the person X, preferably refers to a direction in which the laser beam L is not irradiated on the person X, and more preferably refers to a direction in which the laser beam L is not made incident on the image capturing area SC at time when the person X is detected. Consequently, it is possible to more conspicuously exert the effects explained above.

An image of the image capturing area SC at times T1 and T2 during movement of the fifth arm 225 in an direction of an arrow A based on a position command is shown in FIG. 8. At time T1, since the human detection sensor 3 does not detect the person X, the robot arm controller 52 directly moves the fifth arm 225 in the arrow A direction based on the position command. At time T2, when the human detection sensor 3 detects the person X, if the robot arm controller 52 directly moves the fifth arm 225 in the arrow A direction, the laser beam L is irradiated on the person X. Therefore, the robot arm controller 52 changes the direction of the fifth arm 225 to prevent the laser beam L from being irradiated on the person X. In this case, the movement of the fifth arm 225 in the arrow A direction may be continued. Consequently, the irradiation of the laser beam L on the person X is suppressed. The robot system 1 is safer for the person X.

The camera 31 includes, as the image capturing area SC, the first region SC1 separated a predetermined distance from the camera 31 and overlapping the irradiation range SL of the laser beam L on an imaginary plane orthogonal to the optical axis of the camera 31 and the second region SC2 located on the outer side of the first region SC1 and surrounding the entire circumference of the first region SC1. Except when the person X is present in the first region SC1 from the beginning, the person X is always detected in the second region SC2 earlier than in the first region SC1 when the fifth arm 225 is moved. Therefore, it is possible to detect the person X before the person X enters the irradiation range SL. It is possible to change the direction of the fifth arm 225 to prevent the laser beam L from being irradiated on the person X. Therefore, the irradiation of the laser beam L on the person X is suppressed. The robot system 1 is safer for the person X. In particular, in this embodiment, the second region SC2 surrounds the entire circumference of the first region SC1. Therefore, irrespective of which direction the fifth arm 225 moves, it is possible to detect the person X in the second region SC2 earlier than in the first region SC1.

As explained above, in the camera 31, the second region SC2 is further divided into two or more areas (in this embodiment, four areas A1 to A4). Therefore, when detecting the person X in the second region SC2, the robot arm controller 52 changes the direction of the fifth arm 225 to direct the emitting direction of the laser beam L to the sides of areas (in FIG. 8, the areas A3 and A4) not overlapping the person X among the areas A1 to A4. In this case, the robot arm controller 52 may direct the emitting direction of the laser beam L to the areas A3 and A4 or may direct the emitting direction of the laser beam L to the outer side of the areas A3 and A4. Consequently, the robot arm 22 is relatively simply controlled. The irradiation of the laser beam L on the person X is suppressed. The robot system 1 is safer for the person X. The number of regions included in the second region SC2 is not particularly limited and may be one to three or may be five or more.

When a member 7 made of an absorbing member that absorbs at least a part of the laser beam L or a scattering member that scatters the laser beam L is disposed around the robot 2 as shown in FIG. 9 and the camera 31 detects the person X, the robot arm controller 52 may control the driving of the fifth arm 225 to direct the laser beam L to the direction of the member 7. Consequently, the irradiation of the laser beam L on the person X is suppressed. The robot system 1 is safer for the person X. The absorbing member that absorbs the laser beam L is not particularly limited. For example, a structure that is black, has very small unevenness formed on the surface of the structure, and can suppress reflection of the laser beam L can be used. The scattering member that scatters the laser beam L is not particularly limited. For example, a structure that has a reflection surface, on the surface of which very small unevenness is formed, and can irregularly reflect the laser beam L can be used.

The control method for the fifth arm 225 during the movement of the fifth arm 225 in the arrow A direction based on the position command is explained above. The same applies when, for example, the camera 31 detects the person X in the image capturing area SC while the three-dimensional measurement of the object W is performed by the three-dimensional measuring device 4. In this case, the robot arm controller 52 transmits a command for stopping the three-dimensional measurement of the object W to the three-dimensional measuring device 4 and changes the direction of the fifth arm 225 to prevent the laser beam L from being irradiated on the person X. Consequently, the irradiation of the laser beam L on the person X is suppressed. The robot system 1 is safer for the person X. After it is confirmed that the person X exits the image capturing area SC, the stopped three-dimensional measurement of the object W only has to be performed again from the beginning or may be resumed from a part where the three-dimensional measurement is suspended.

In the control method explained above, the direction of the fifth arm 225 is changed to prevent the laser beam L from being irradiated on the person X. However, not only this, but, for example, the emitting direction of the laser beam L may be changed by changing a scanning direction of the laser beam L in the optical scanner 45 while keeping the direction of the fifth arm 225.

When the camera 31 detects the person X in the image capturing area SC, control explained below may be performed together with the control by the robot arm controller 52 explained above. For example, when the camera 31 detects the person X in the image capturing area SC, the three-dimensional measuring device 4 may reduce the power of the laser beam L (including stopping the emission of the laser beam L) or may change a turning angle and a frequency of the optical scanner 45 compared with when the camera 31 does not detect the person X in the image capturing area SC. Consequently, even if the laser beam L is irradiated on the person X, an energy amount of the laser beam L can be reduced. Therefore, the robot system 1 is safer for the person X. A method of reducing the power of the laser beam L is not particularly limited. Examples of the method include a method of reducing the power of the laser beam source 42, a method of disposing a dimmer filter such as an ND filter on the optical path of the laser beam L, and a method of disposing an aperture on the optical path of the laser beam L and stopping down the aperture.

The robot system 1 is explained above. Such a robot system 1 includes, as explained above, the robot 2 including the robot arm 22, the three-dimensional measuring device 4 disposed in the robot arm 22 and configured to perform the three-dimensional measurement of the object W using the laser beam L, the human detection sensor 3 disposed in the robot arm 22 and configured to detect a person based on an image obtained by imaging the detection range including the object W, and the robot controller 5 configured to control the robot 2. The robot controller 5 includes the human detection signal receiver 51 configured to receive, from the human detection sensor 3, a signal indicating that the person is present in the detection range and the robot arm controller 52 configured to control the robot arm 22 based on the signal. When the human detection signal receiver 51 receives, from the human detection sensor 3, the signal indicating that the person X is present in the detection range, the robot arm controller 52 controls the robot arm 22 to set the emitting direction of the laser beam L to a direction different from the direction of the person X. Consequently, the irradiation of the laser beam L on the person X is suppressed. The robot system 1 is safer for the person X.

As explained above, the robot controller 5 is the device that couples the three-dimensional measuring device 4 that performs the three-dimensional measurement of the object W using the laser beam L and the human detection sensor 3 that detects the person X based on an image obtained by imaging the detection range including the object W. The robot controller 5 includes the human detection signal receiver 51 configured to receive, from the human detection sensor 3, a signal indicating that the person X is present in the detection range and the robot arm controller 52 configured to control the robot arm 22 based on the signal from the human detection sensor 3. When the human detection signal receiver 51 receives, from the human detection sensor 3, the signal indicating that the person X is present in the detection range, the robot arm controller 52 controls the robot arm 22 to set the emitting direction of the laser beam L to a direction different from the direction of the person X. Consequently, the irradiation of the laser beam L on the person X is suppressed. The robot system 1 is safer for the person X.

As explained above, the robot arm controller 52 controls the robot arm 22 to emit the laser beam L toward the member 7 that absorbs or scatters a part of the laser beam L. Consequently, the irradiation of the laser beam L on the person X is more surely suppressed. The robot system 1 is safer for the person X.

As explained above, the image capturing area SC, which is the detection range of the human detection sensor 3, includes the entire region of the irradiation range SL. Consequently, the person X can be detected before the laser beam is irradiated on the person X. Therefore, the irradiation of the laser beam L on the person X is more surely suppressed. The robot system 1 is safer for the person X.

As explained above, the image capturing area SC, which is the detection range, is divided into two or more areas (regions). When the human detection signal receiver 51 receives, from the human detection sensor 3, a signal indicating that the person X is present in the image capturing area SC of the human detection sensor 3, the robot arm controller 52 controls the robot arm 22 to emit the laser beam L toward the side of a region different from a region where the person X is detected. Consequently, the irradiation of the laser beam L on the person X is more surely suppressed. The robot system 1 is safer for the person X.

The robot controller and the robot system of the present disclosure are explained above based on the illustrated embodiment. However, the present disclosure is not limited to this. The components of the sections can be replaced with any components having the same functions. Any other components may be added to the present disclosure.

What is claimed is:

1. A robot controller that couples a three-dimensional measuring device configured to perform three-dimensional measurement of an object using a laser beam and a human detection sensor configured to detect a person based on an image obtained by imaging a detection range including the object, the robot controller comprising:

a human detection signal receiver configured to receive, from the human detection sensor, a signal indicating that the person is present within the detection range; and a processor configured to control a robot arm based on the signal, wherein when the human detection signal receiver receives, from the human detection sensor, the signal indicating that the person is present within the detection range, the processor controls the robot arm to set an emitting direction of the laser beam to a direction different from a direction of the person, wherein the detection range of the human detection sensor includes an irradiation range of the laser beam.

2. The robot controller according to claim 1, wherein the processor controls the robot arm to emit the laser beam toward a member that absorbs or scatters a part of the laser beam.

3. The robot controller according to claim 1, wherein
the detection range is divided into two or more regions, and when the human detection signal receiver receives, from the human detection sensor, the signal indicating that the person is present within the detection range of the human detection sensor, the processor controls the robot arm to emit the laser beam toward a side of a region different from a region where the person is detected.

4. A robot system, comprising:
a robot including a robot arm;
a three-dimensional measuring device disposed in the robot arm and configured to perform three-dimensional measurement of an object using a laser beam;
a human detection sensor disposed in the robot arm and configured to detect a person based on an image obtained by imaging a detection range including the object; and
a robot controller configured to control the robot, wherein the robot controller includes:
a human detection signal receiver configured to receive, from the human detection sensor, a signal indicating that the person is present within the detection range; and
a processor configured to control the robot arm based on the signal, and
when the human detection signal receiver receives, from the human detection sensor, the signal indicating that the person is present within the detection range, the processor controls the robot arm to set an emitting direction of the laser beam to a direction different from a direction of the person, wherein the detection range of the human detection sensor includes an irradiation range of the laser beam.

5. The robot system according to claim 4, further comprising a member configured to absorb or scatter a part of the laser beam, wherein
the processor controls the robot arm to emit the laser beam toward the member that absorbs or scatters a part of the laser beam.

6. The robot system according to claim 4, wherein
the detection range is divided into two or more regions, and
when the human detection signal receiver receives, from the human detection sensor, the signal indicating that the person is present within the detection range of the human detection sensor, the processor controls the robot arm to emit the laser beam toward a side of a region different from a region where the person is detected.

* * * * *